United States Patent
Winkler (10) Patent No.: US 6,880,311 B2
(45) Date of Patent: Apr. 19, 2005

(54) METHOD AND DEVICE FOR STACKING GOODS ON A PALLET

(75) Inventor: Walter Winkler, Parkstein (DE)

(73) Assignee: Witron Logistik + Informatik GmbH, Parkstein (DE)

( * ) Notice: Subject to any disclaimer, the term of this patent is extended or adjusted under 35 U.S.C. 154(b) by 2 days.

(21) Appl. No.: 10/341,844

(22) Filed: Jan. 13, 2003

(65) Prior Publication Data

US 2004/0018077 A1 Jan. 29, 2004

(30) Foreign Application Priority Data

Jul. 29, 2002 (DE) .................................... 202 11 672 U
Oct. 28, 2002 (DE) ........................................ 102 50 145

(51) Int. Cl.⁷ ........................ B65B 35/50; B65B 27/00; B65D 19/00; B65G 57/00
(52) U.S. Cl. ............................ 53/399; 53/441; 53/556; 53/588; 53/447; 53/535; 53/541; 206/597; 206/600; 220/4.31; 414/788.9; 414/924
(58) Field of Search ........................ 53/447, 442, 399, 53/540, 541, 556, 588, 210, 535, 536; 414/788.9, 924; 206/597, 600; 220/4.31, 6

(56) References Cited

U.S. PATENT DOCUMENTS

| | | | | |
|---|---|---|---|---|
| 3,888,379 A | * | 6/1975 | Folberth | 220/4.28 |
| 4,098,051 A | * | 7/1978 | Cordes et al. | 53/442 |
| 4,546,593 A | * | 10/1985 | Lasscock | 414/788.9 |
| 4,593,517 A | * | 6/1986 | Mattila | 53/556 |
| 4,607,476 A | * | 8/1986 | Fulton, Jr. | 53/399 |
| 5,056,667 A | * | 10/1991 | Coogan | 206/600 |
| 6,227,397 B1 | * | 5/2001 | Kim | 220/8 |
| 6,594,970 B1 | * | 7/2003 | Hyne et al. | 53/399 |

FOREIGN PATENT DOCUMENTS

| | | | | |
|---|---|---|---|---|
| CH | 678842 A5 | * | 11/1991 | B65D/19/10 |
| DE | 4242581 A1 | * | 6/1993 | B65D/19/12 |

* cited by examiner

Primary Examiner—Stephen F. Gerrity
(74) Attorney, Agent, or Firm—DLA Piper Rudnick Gray Cary US LLP

(57) ABSTRACT

A stacking aid for stacking goods on a loading aid, such as a pallet, has wall parts surrounding the goods stacked on the loading aid. It is possible to alter the height of at least one of the wall parts and to remove the stacking aid from the loading aid after completion of the stacking procedure. A method for stacking goods on a loading aid, such as a pallet, with the aid of the stacking aid entails (a) obtaining a stacking aid which surrounds a stack of goods on the loading aid, (b) loading the loading aid with goods by using the stacking aid, and (c) lifting the loading aid relative to the stacking. The stack of goods lifted out of the stacking aid are wrapped for stabilization. The invention makes it possible to efficiently secure the stack of goods on the pallet during the commissioning through the removable stacking aid and during the subsequent transportation of the goods by the stabilizing the goods, for instance with a film.

19 Claims, 9 Drawing Sheets

(PRIOR ART)

FIG.4

(PRIOR ART)

FIG.5

(PRIOR ART)

(PRIOR ART)

(PRIOR ART)

FIG.8

(PRIOR ART)

METHOD AND DEVICE FOR STACKING GOODS ON A PALLET

The invention relates to a device and a system for stacking goods on a loading aid, preferably a pallet.

In pallet-commissioning systems according to the prior art, there is the problem of securing goods stacked on a pallet or another loading aid (LA) for the purpose of commissioning. Conventionally, goods are manually stacked on a pallet, for example a Europallet having the dimensions 800 mm×1200 mm or a Düsseldorf pallet (800 mm×600 mm), in accordance with a commissioning order. When the stacked goods on the pallet reach a certain height, the stack becomes visibly unstable. Without a system for securing the goods, a commissioner has great problems forming a stable stack. In order to achieve this nevertheless, either he needs a lot of experience or the pallets must not be loaded or stacked too high with goods, but this leads to insufficient utilisation of space, for example in a lorry for transporting the loaded pallets.

In order to solve this problem of securing the goods, various attachable systems or supports which can be attached to the pallet have been proposed in the prior art. Quite often, the attachable systems have additionally been used themselves for stacking the pallets.

Figure 1:
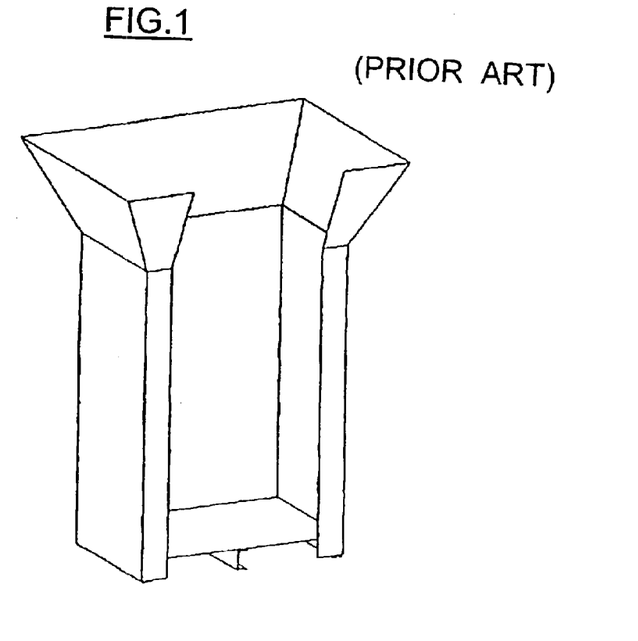
FIGS. 1 to 8 show systems for securing goods according to the prior art.

German Laid-Open Application DE 100 20 475 A1 with the title "Device for aligning pallet stacks" discloses the mechanical alignment of pallet stacks with the aid of a sheet-metal box provided with a funnel top, shown in FIG. 1. In this case, the pallet is loaded with the goods beforehand at another location. Then, with the aid of a fork lift truck for example, the (irregularly) loaded pallet is introduced into the aligning device and, once the goods have been "sorted" by the downwardly tapering funnel, it is removed again.

Figure 2:
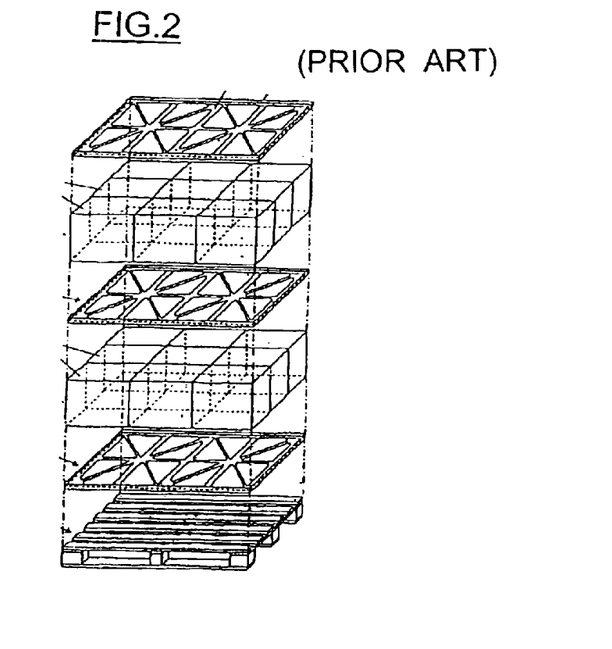

German Utility Model DE 299 21 226 U1 with the title "Adapter plate for stacking articles on a pallet" discloses a narrow plate which is surrounded by a border and is placed onto the pallet. Goods, such as for example cardboard boxes, are subsequently placed onto this plate, which is shown in FIG. 2. The border around the plate holds the cardboard boxes optimally on the plate. Onto the layer of goods thus produced is placed the next adapter plate, and this can then be followed by further layers of goods and adapter plates. The result is a vertically aligned stack of goods on the plate. However, this system only works when the geometry of the goods to be stacked is designed such that the latter completely fill the stacking plate and have a uniform height which enables a further stacking plate to be placed onto the layer of goods thus formed.

Figure 3:
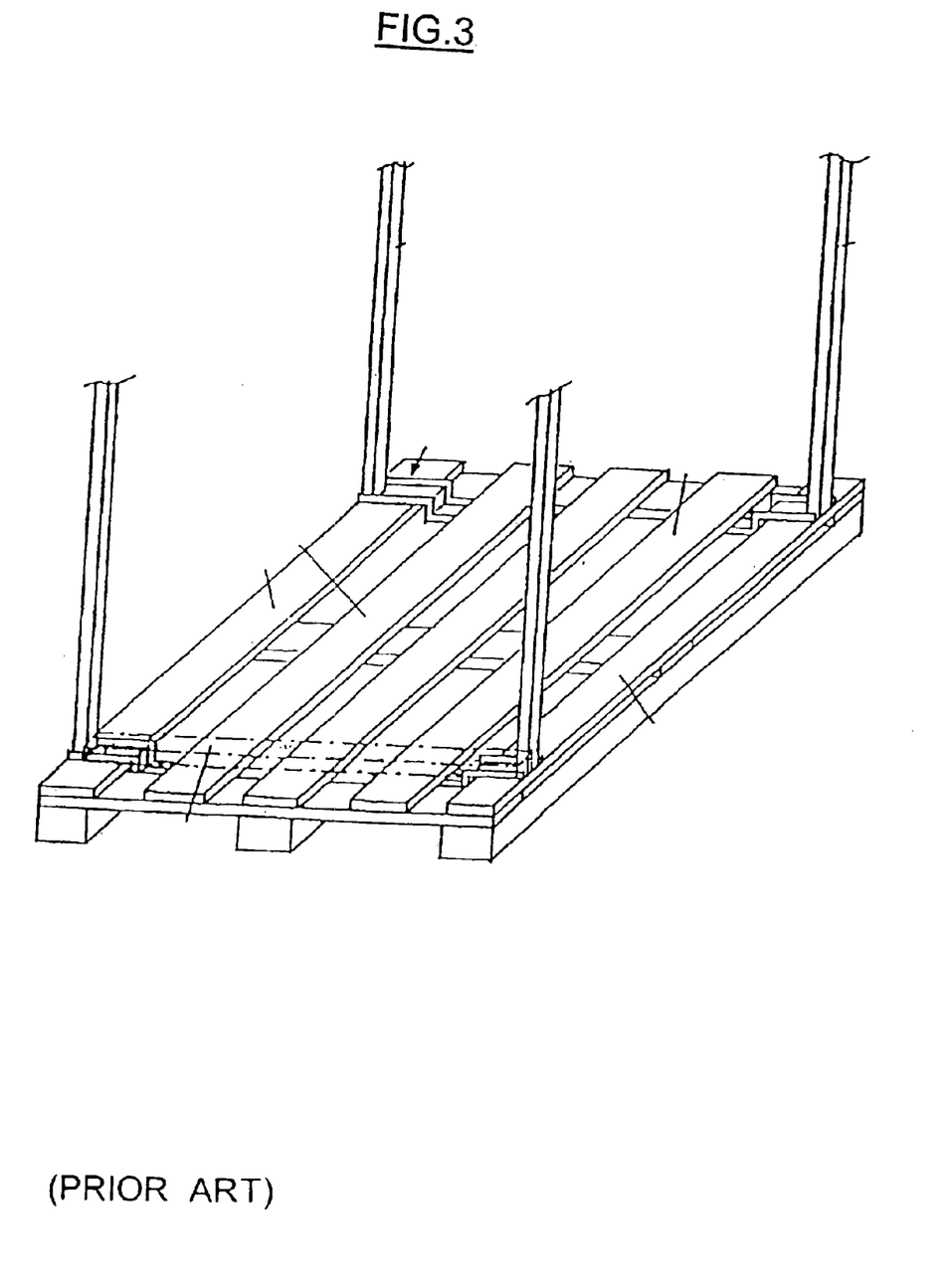

German Utility Model G 93 04 124.1 with the title "Stacking support for pallets" describes stacking supports, as shown in FIG. 3, which are attached close to the corners of the pallets in order to secure the goods. However, these supports provide the goods to be stacked with only inadequate protection from movement, since they are provided merely in the corners but not at the sides.

Figure 4:
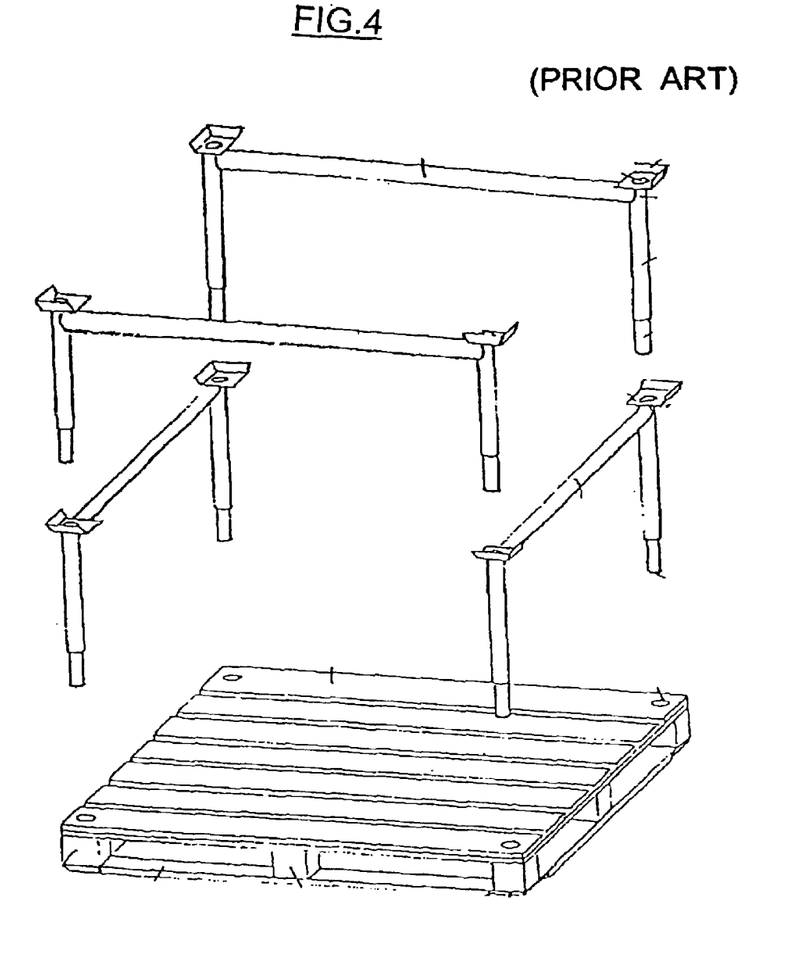

German Patent DE 37 28 647 C2 with the title "Pallet having protecting and stacking bars" discloses a pallet, shown in FIG. 4, to which bars having crossmembers can be attached. Bores are provided in the corners of the pallet for this purpose, so that a first pair of bars can be attached for example parallel to the short sides of the pallet. A further pair of bars, oriented parallel to the long sides of the pallet, can then be pushed into this pair of bars, and so on. A type of frame is thereby obtained, although the lateral areas are only supported by bars, so that here too goods, in particular small parts, can fall off the pallet.

Figure 5:
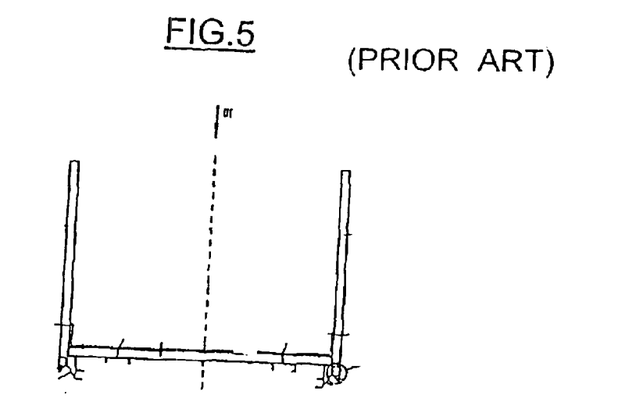

German Patent DE 44 03 743 C2 with the title "Pallet for receiving goods for storage" describes a flat pallet, as shown in FIG. 5, having two parallel lateral supporting areas for receiving goods for storage, whereby the stacking of goods on the pallet is to be facilitated. The supports are detachably designed, so that the pallets can be stacked directly on top of one another in the empty state, thereby greatly reducing the space requirement. However, there is still a risk of the goods to be stacked falling off the pallet laterally.

Figure 6:
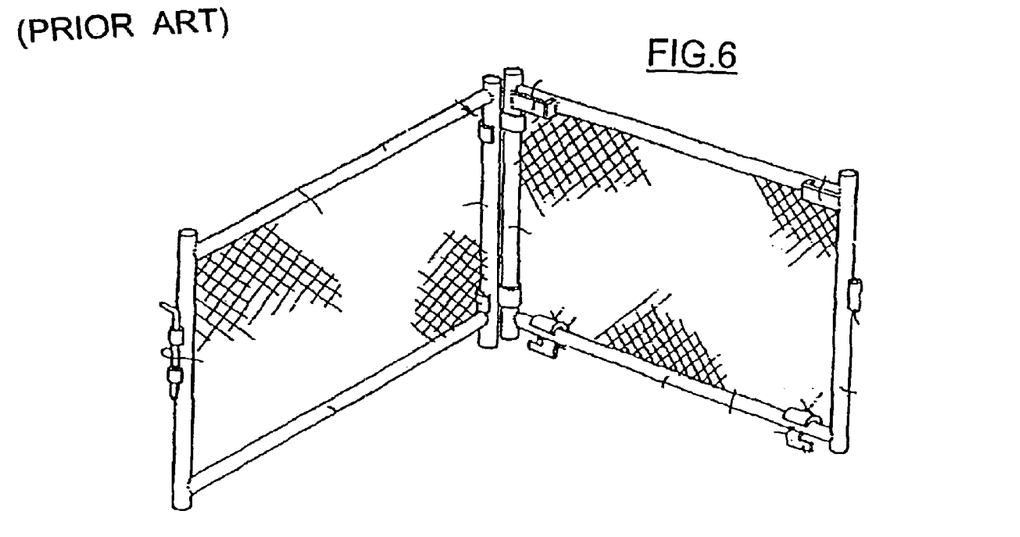
Figure 7:
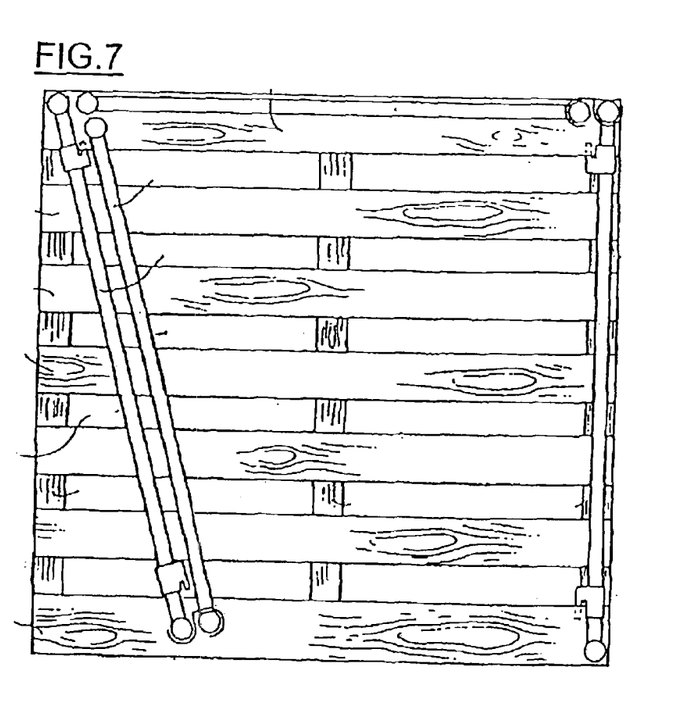

German Patent DE 27 31 948 C2 with the title "Pallet cage latching wall" (cf. FIG. 6 and FIG. 7) and German Utility Model DE 200 11 113 U1 (not shown) with the title "Lattice box" each disclose pallets on which a four-sided supporting structure is respectively mounted. The structures provide the goods with support. In the first document, one of the sides is foldable or can be removed from the frame in order to stack goods on the pallet. The disadvantage here however is that the loaded pallets can only be transported together with the frame. Removal of the frame is not possible, since this would put the stacked goods at risk of falling off the pallet. Furthermore, the movable side must be closed when the stacked goods reach a certain height, to prevent the goods already stacked from slipping off the pallet. The pallet can then only be loaded from above, so that the height of the commissioning person constitutes a physical limit up to which the pallet can be loaded.

German Utility Model G 85 02 822.3 with the title "Stacking element for packaging containers to be stacked on top of one another" discloses a corner-angle profile with base plate, on which packages can be stacked in a directed manner.

German Laid-Open Application DE 39 06 922 A1 with the title "Device and method for stacking and wrapping articles" discloses a fully automatic system which can be used both to load pallets (straight and vertically) and to wrap them with films. The wrapping takes place either at intervals of one layer at a time of the articles stacked on the pallet or at the end, when loading of the pallet is complete.

Figure 8:
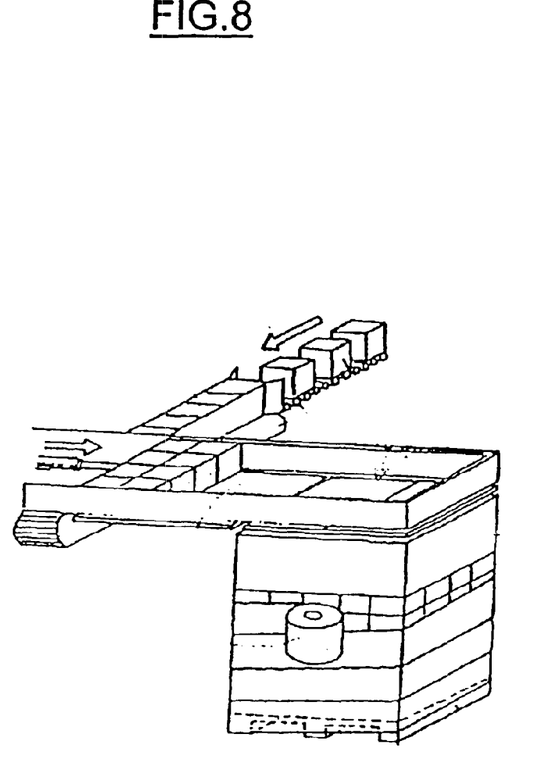

American Patent U.S. Pat. No. 4,593,517 (cf. FIG. 8) with the title "Method and apparatus for packing goods" likewise discloses a system which wraps the pallets when loading is complete. In this case, the pallets are loaded fully automatically. The loading in a straight aligned manner is in this case ensured by a height-adjustable guide frame. However, the pallets are in this case loaded with geometrically regular articles, such as for example cuboids, which can be stacked in layers.

A similar system is disclosed in German Patent DE 44 12 830 C2 with the title "Device for palletising rectangular piece goods, such as sacks, crates, cardboard boxes".

A disadvantage of the above-described systems and devices is that the pallet, at the time of final securing, for example by wrapping with a film, stands free and thus may be unstable. This could give one the idea of delivering the pallet together with the attachable system, as has in fact already been proposed in some of the conventional attachable systems. However, it has proved disadvantageous in this regard that the attachable system must be demounted when transporting the pallets from the destination back to the place of commissioning, in order to utilise optimally the space available in a lorry for example. If the attachable system is demounted, it must however be re-attached at the place of commissioning, thus resulting in increased personnel expenditure. If the problem of securing the goods is solved by continuous manual wrapping of the stack of goods, this results in a loss of time and thus a lower commissioning output of the commissioner.

It is therefore an object of the present invention to provide a device for stacking goods on a pallet, by means of which a pallet can be loaded quickly and safely while taking ergonomic considerations into account.

A further object of the present invention is to increase the commissioning output of a commissioner when stacking goods on pallets.

According to one aspect of the invention, a stacking aid is provided for stacking goods, in particular goods from a commissioning system in accordance with a commissioning order, in any way and any order on a pallet which can be inserted into the device, the stacking aid having four wall parts surrounding a stack of goods stacked on the pallet, and at least one wall part being height-adjustable and thus adaptable to the changing height of the stack of goods already stacked on the pallet, and the stacking aid being removable from the pallet again after completion of the goods-stacking procedure.

According to one embodiment, the upper border of the front and/or rear wall is designed such that the upper border can be adapted to the changing height of the stack of goods already stacked on the pallet.

According to a further embodiment, the front wall consists of a plurality of elements which are interconnected in a push-in manner or by a hinge, or is a roller shutter or a sliding wall.

According to a further embodiment of the invention, the rear wall consists of a plurality of elements which are interconnected in a push-in manner or by a hinge, or the rear wall is a roller shutter or a sliding wall.

According to a further embodiment of the invention, the device has a base part, to which the side walls can be fastened.

According to a further embodiment of the invention, the side walls can be pushed into the base or are each connected to the base via a hinge.

According to a further embodiment of the invention, the front wall is connectable to the side walls.

According to a further embodiment of the invention, the side walls each have vertical cutouts, through which vertically movable pins can reach under a fully loaded pallet, in order thus to lift or lower the pallet relative to the device.

According to a further embodiment of the invention, the device has means for lifting the device relative to the pallet on at least one of the walls.

According to a further embodiment of the invention, the means for lifting are cutouts in or projections on the wall which are connectable to an external device for lifting the device.

According to the invention, in addition a method for stacking goods on a loading aid is proposed, comprising the following steps: (a) placing in readiness a stacking aid, which surrounds a stack of goods stacked on the loading aid, (b) loading the loading aid with goods with the aid of the stacking aid, and (c) lifting the loading aid relative to the stacking aid, the stack of goods lifted out of the stacking aid being at the same time continuously wrapped with a stabilising means, for instance a film, for stabilisation.

Further objects, features and advantages of the present invention will become clearer from the following description together with the attached drawings, in which.

Figure 9:
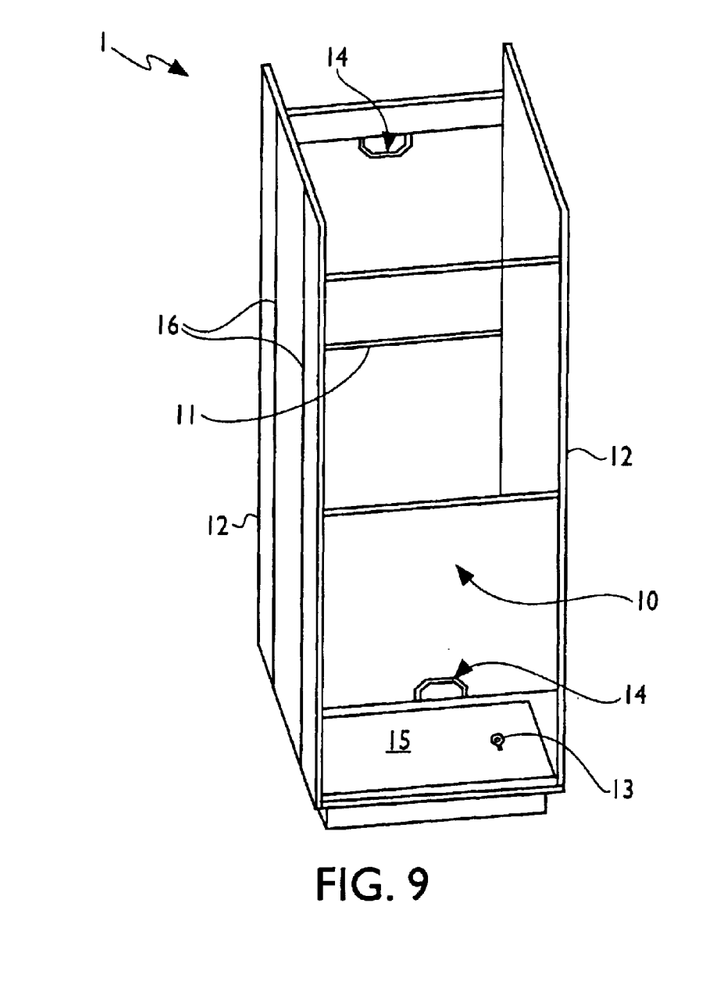
FIG. 9 shows a first exemplary embodiment according to the invention, which does not yet contain a pallet with goods stacked thereon.
Figure 10:
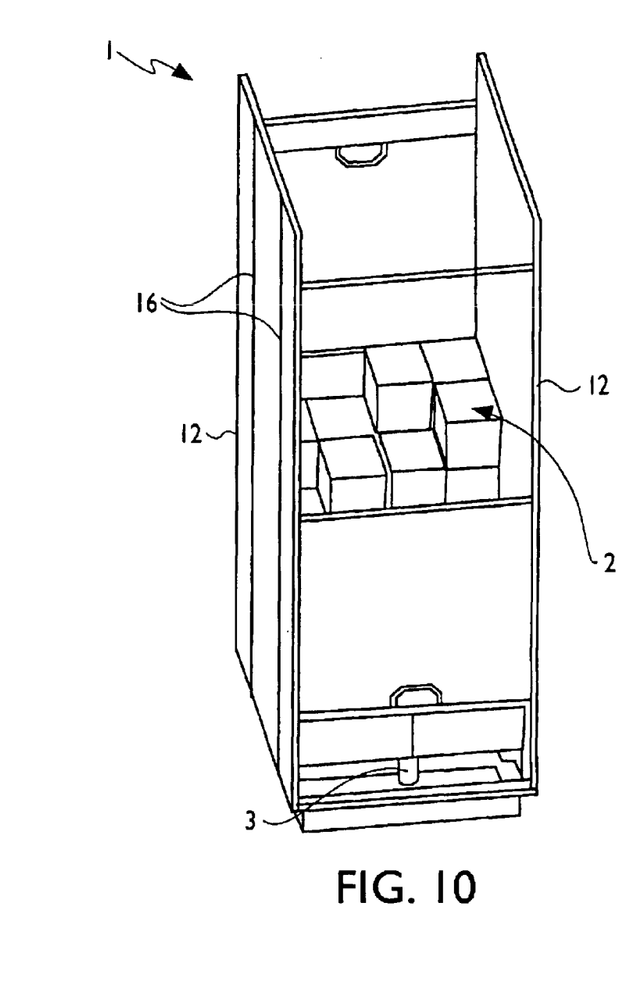
FIG. 10 shows the stacking aid according to FIG. 9 with pallet and goods stacked thereon.

FIGS. 9 and 10 disclose a first embodiment of the device according to the invention. The stacking aid 1 for stacking goods 2, which are shown by way of example in FIG. 10, in particular goods from a commissioning system, is also referred to as a container hereinbelow. The pallet 3 is not shown in FIG. 9. However, it can be seen in FIG. 10. The container 1 has a front wall 10, a rear wall 11 and two side walls 12. In the exemplary embodiment shown in FIG. 9, the front wall 10 is connected to the side walls 12 so that a gap or a compartment 13 is formed between the base on which the container 1 stands and the bottom edge of the front wall 10, into which gap or compartment a pallet can be inserted. The front wall 10 consists of a plurality of parts. Here in FIG. 9 it consists of two parts, which are foldably interconnected via a hinge (not shown). In the case shown, the upper element of the front wall 10 is folded onto the lower element. The upper element has a handle 14 to enable it to be folded up by a commissioner. Optionally, the rear wall 11 also has a plurality of elements. In the example of FIG. 9, the rear wall 11 also consists of two foldably interconnected elements, with a handle 14 likewise being provided on the upper element. The upper element of the rear wall is shown in the folded-up state.

In FIG. 10 the container 1 as already shown in FIG. 9 can be seen. In this illustration, however, a loading aid (pallet) 3 has been pushed into the gap or compartment 13. Furthermore, goods 2 have been stacked on the pallet 3, the walls of the container 1 preventing the goods 2 from slipping off the pallet 3. The height of the foldable elements of the front wall 10 is chosen such that the top edge of the lower element comes up to the waist of a commissioner. A commissioner can thus place or throw goods 2 onto an empty pallet 3. He need not worry about the goods slipping off the pallet 3, since the walls of the container 1 ensure that the goods are adequately secured. If the stack of goods inside the container becomes so high that there is a danger of the goods toppling over towards the commissioning person, the second element of the front wall 10 can be folded up, thereby likewise securing the goods. The height of the second element can be chosen such that a commissioner can still load the pallet comfortably.

In the embodiment of the invention shown in FIGS. 9 and 10, the front- and rear-wall elements in each case consist of two foldably interconnected elements. It is however also possible to provide more elements, in order to make the stacking even more ergonomic for the commissioner. Moreover, instead of using a folding mechanism, the elements can also be interconnected in a push-in manner. Alternatively, both the front wall 10 and the rear wall 11 can be designed as a roller shutter or a sliding wall, thereby ensuring the height adjustability of the respective wall. As a result of the fact that both the rear wall and the front wall can be designed to be height-adjustable, the commissioner can place the goods onto the pallet without any problems from two sides. Optionally, the container 1 can also be equipped with a base 15, as shown in FIG. 9. Moreover, the base can have a structure similar to the structure of the pallet substructure, which is determined by the handling system used. It is thus also possible to move the container on the hitherto customary handling systems already available.

Furthermore, in the two side walls 12 there can be provided cutouts 16, for example in the form of guide rails, which are constructed parallel to the long side of the side wall 12. The side walls 12 can be made for example from sheet metal, in order to give the container overall stability. Pins can be introduced into the guide rails 16 to separate the pallet 3 from the container 1, these pins reaching under the pallet 3 situated in the container 1. Optionally, other cutouts or projections on the walls can also be provided, into which an external device engages for lifting or lowering the pallet relative to the container.

Figure 11A:
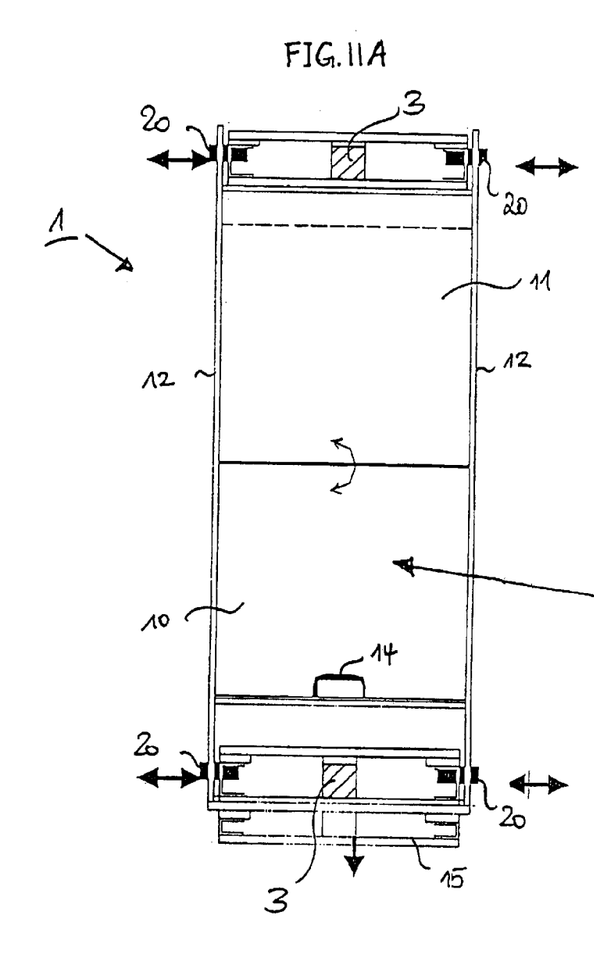
FIGS. 11A and 11B show a front and side view of the stacking aid according to FIG. 9.
Figure 11B:
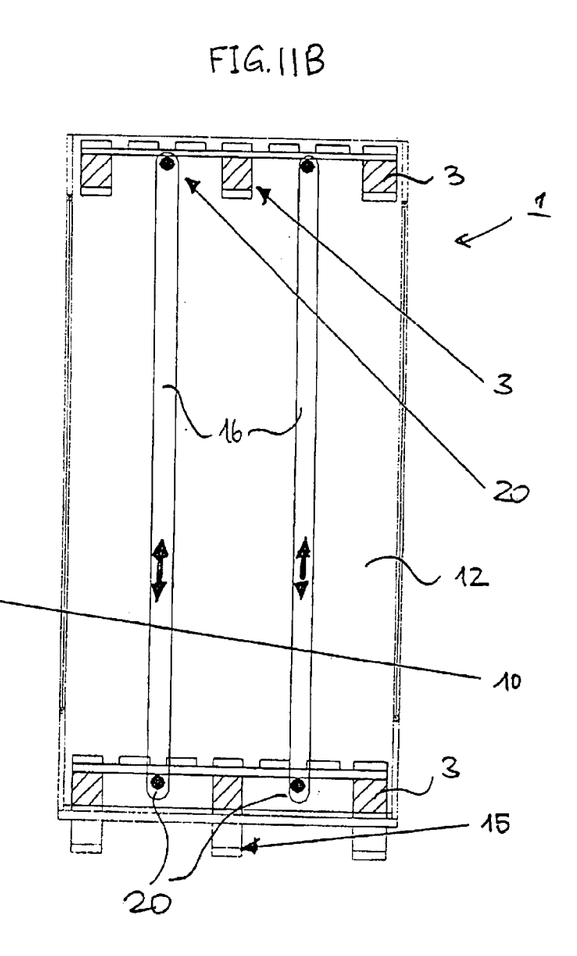

FIGS. 11A and 11B show the container 1 according to FIG. 9 in a front and side view, respectively. In the front view of FIG. 11A, the upper element of the front wall 10 is again folded onto the lower element of the front wall. In the lower part of FIG. 11A, there can be seen a pallet 3, which has been introduced into the container 1. There are no goods 2 stacked on the pallet 3. Also shown are two pins 20, which have already been inserted laterally under the pallet 3 through the cutouts 16 (not shown in FIG. 11A) in the side walls 12. A pallet 3 held by pins 20 is likewise shown in the upper part of FIG. 11A. The black double arrows in FIG. 11A indicate that the pins 20 can be laterally inserted into and removed from the cutouts 16 (not shown). The pins 20 are movable along the guide rails 16, i.e. parallel to the height of the container 1. This becomes particularly clear from FIG. 11B.

FIG. 11B shows a side view of the container of FIG. 11A. The cutouts or guide rails 16 run parallel to the long side of the respective side wall 12. The pins 20 can be inserted into them in order to reach under the pallet 3. Once the pins 20 are under the pallet 3, the latter can be moved upwards for example. This state is shown in the upper half of FIG. 11B. The structure of the base 15, already mentioned hereinabove, can be seen clearly in this illustration. The base 15 of the container 1 is designed in a similar way to the base of a pallet 3.

According to a further embodiment (not shown), the pins 20 can be part of a lifting mechanism, which in turn is part of the container 1. By way of example, the base 15 could have a cavity, in which the lifting mechanism is integrated. Generally, however, the lifting mechanism and the pins will belong to an external device which is used to move the pallet 3 relative to the container 1.

Figure 12A:
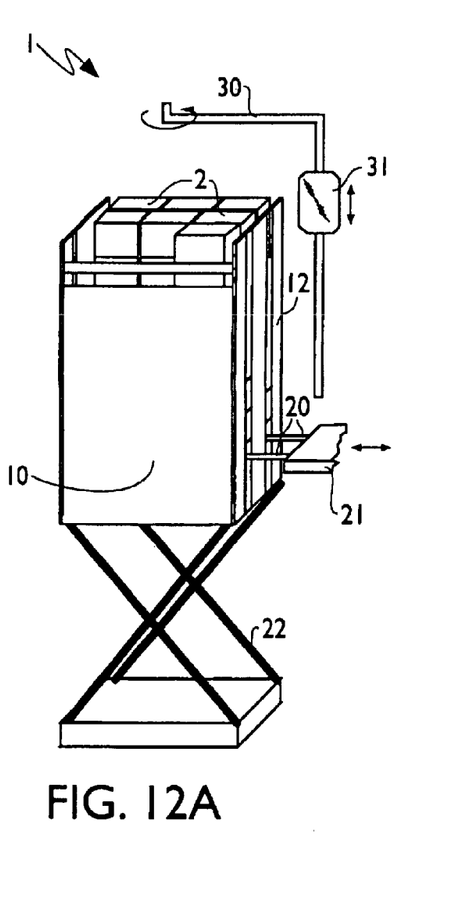
FIGS. 12A to 12C show a system according to the invention.
Figure 12B:
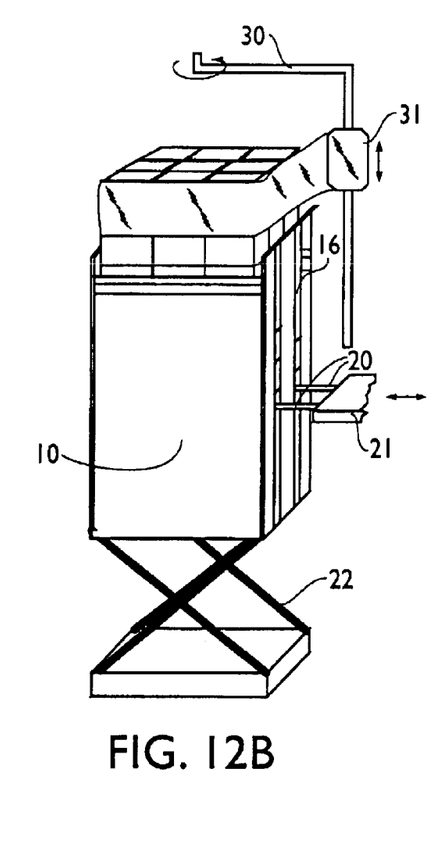
Figure 12C:
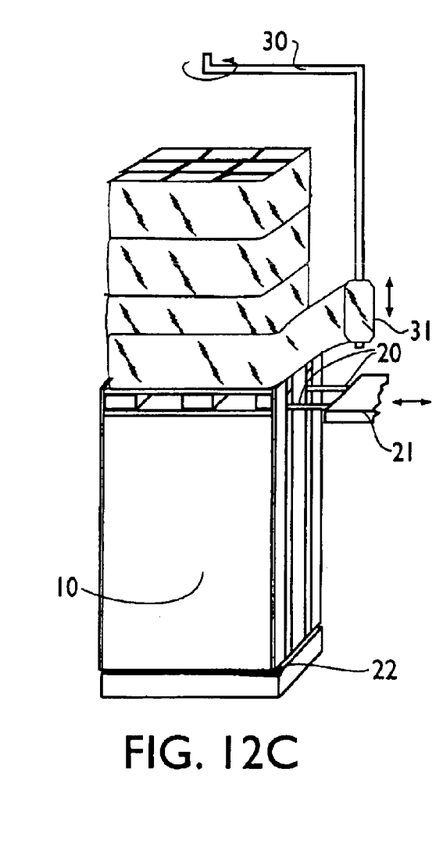

FIGS. 12A to 12C illustrate the method according to the invention for stacking goods on a pallet. Reference numeral 21 shows part of an external lifting mechanism. The container 1 is provided on a (external) lifting platform 22. Also shown is a wrapping device 30 with an arm which is rotatable about the longitudinal axis of the container, this being indicated by a circular arrow. On the arm of the wrapping device 30 there is provided a film roll 31. Instead of a film, it is also possible to employ shrink film, a net or silk as stabilising means for the stack of goods.

FIG. 12A shows the situation where the pallet situated in the container 1 is fully loaded with goods 2. The pins 20 of an external lifting mechanism 21 reach under the pallet through the guide rails 16 in one of the side walls 12. It can also be seen in FIG. 12A that the front wall 10 is embodied by a roller shutter, which in this state (the fully loaded pallet) is pulled to the very top. The wrapping device 30 is provided in order to wrap the stack of goods with the film 31 so that the goods 2 are secured, for example for transporting, on the pallet. To this end, the stack of goods must be moved relative to the container 1. In this regard, two alternatives are possible. Either the pallet is lifted out of the container 1 (by the external lifting device 21) or the container 1 is lowered relative to the pallet, which is held by the external lifting device 21. The version shown in FIG. 12 concerns the latter alternative.

FIG. 12B shows the state in which the container 1 is lowered by lowering the lifting platform 22 relative to the stack of goods. The portion of the stack of goods which protrudes freely from the container 1 is secured against slipping by the film 31 with the aid of the wrapping device 30. The arm on which the film roll is situated rotates about the exposed portion of the stack of goods, and in so doing the film 31 is unwound from the roll. The unwinding is preferably effected under mechanical stress, so that the free portion of the stack of goods is tightly constricted. It is however equally conceivable for the external lifting device 21 to move the stack of goods upwards relative to the container 1, so that a portion of the stack of goods is exposed and can subsequently be wrapped with the aid of the wrapping machine 30.

FIG. 12C shows an almost completely wrapped stack of goods. The lifting platform 22 is fully lowered, with the result that the container 1 frees the entire stack of goods. When the stack of goods has been completely wrapped, it can be passed on within the commissioning system in order to be loaded, for example, into a lorry which takes the goods thus packed to its destination. A typical application example is the commissioning of goods for the retail trade in a large central warehouse, from where branches are supplied.

Figure 13:
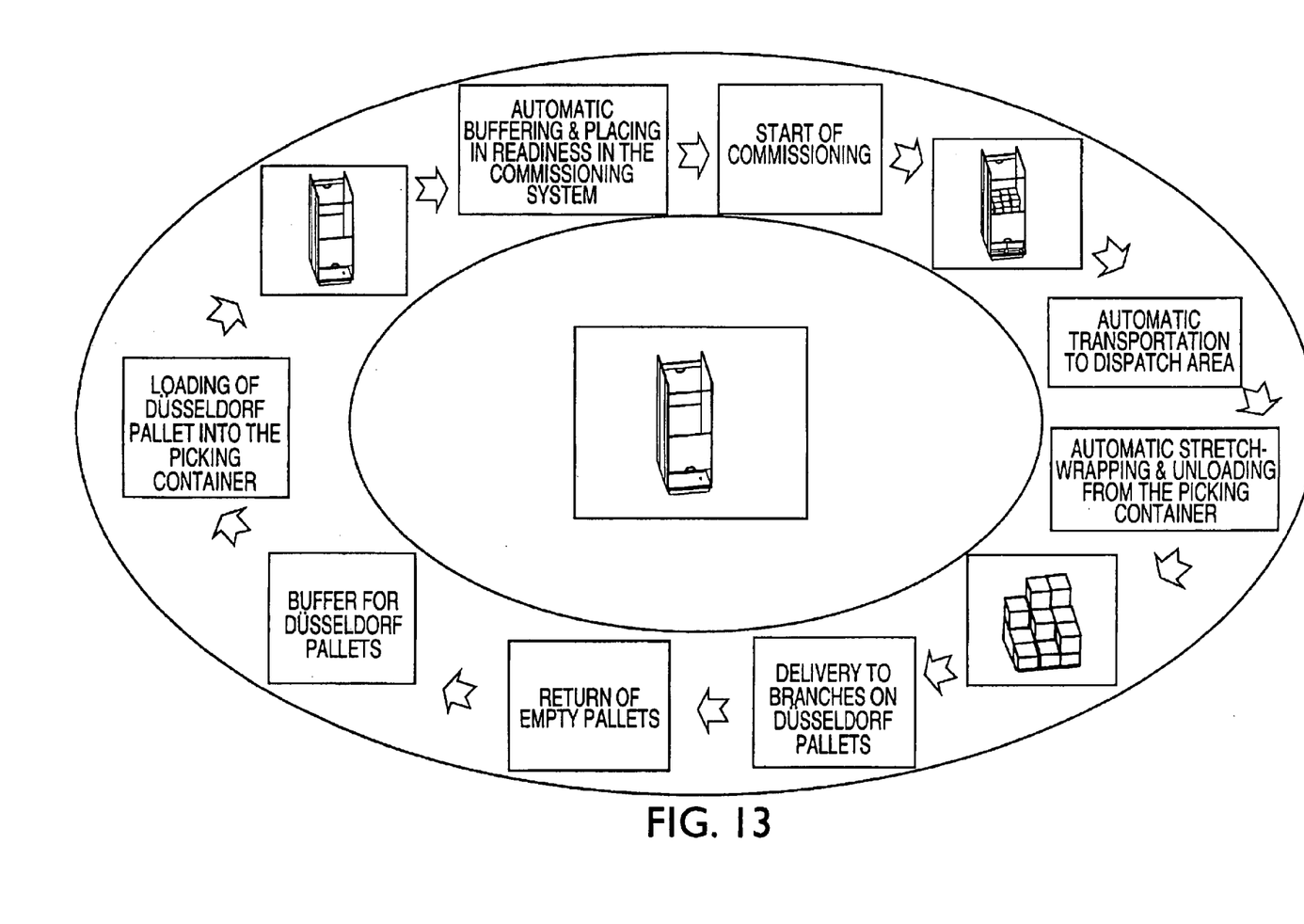
FIG. 13 illustrates a process in which the device according to the invention or the system according to the invention is used.

FIG. 13 shows the typical steps in a commissioning procedure using the method and device according to the invention for stacking goods on pallets. This is a cycle which begins for example at the 12 o'clock position with the start of commissioning. In a first step, a pallet is introduced (fully automatically) into the compartment 13 (cf. FIGS. 9 and 10) of the container 1. Optionally, several of these containers thus prepared can be temporarily stored in a buffer of the commissioning system, to be supplied to the commissioners as required. Subsequently, the commissioner starts to commission the goods into the container in any manner and in any order which appears favourable to him. If the stack protrudes beyond the upper end of the height-adjustable wall or is in danger of becoming unstable, the commissioner can move the front or rear wall, depending on which side is being used for the commissioning, upwards, to provide the exposed goods with support again. The height-adjustable wall ensures, on the one hand, that the commissioner always has optimum access to the stack of goods with regard to the height and, on the other hand, that the stack of goods is at all times optimally protected, against toppling over for instance. When the commissioning of the order on the pallet is completed, the commissioning by the commissioner being simplified by the fact that he does not have to pay attention to the order of the goods to be commissioned, that is to say he can stack them as desired without paying attention to the stability of the stack to be formed, the container is taken into a (automated) separating area, as shown for example in FIG. 12, where the order pallet is separated from the container according to the invention.

This is done by firstly placing the container onto a lifting device, for instance a lifting platform. The pins are then introduced into the pallet through the guide rails and fixed. By lowering the lifting device, and thus also the container, the upper part of the commissioned pallet emerges from the latter and is secured using a load-securing unit, for instance a wrapping machine, by wrapping with film. The order pallet can then be dispatched, while the container can be returned to the buffer. The secured pallet is delivered to the intended branch. The empty pallet is subsequently transported back to the commissioning centre, where it is stored again in a buffer for pallets. It can be removed therefrom in order once again to be introduced into a container according to the invention, at which point the cycle can start again.

The following advantages are thus obtained. There is no need for manual securing of the order pallet by wrapping with film during the commissioning procedure. The picking speed of the commissioner increases, since he does not need to concentrate on the alignment, i.e. stability, of the stack. This results in an increase in the picking output of the commissioner. By virtue of the fact that the container is only employed within the commissioning centre, and is not sent away with the goods as has been customary hitherto, only a limited number of containers are required, resulting in a direct economic benefit. In addition, an ergonomically favourable effect is obtained by virtue of the modular design of the height-adjustable walls, since the stacking of the goods to be commissioned is made easy for a commissioner.

What is claimed is:

1. A stacking aid for stacking goods (2) on a loading aid (3). the stacking aid comprising:
    wall parts (10, 11, 12) configured to surround the goods stacked on the loading aid (3) and enclosing an area corresponding to an area of a pallet, the height of at least one (10) of the wall parts being alterable and the stacking aid (1) being removable from the loading aid (3) after completion of the goods-stacking procedure; and
    a base (15) and an opening (13) formed on one of the wall parts (10, 11, 12) for inserting the loading aid (3).

2. The stacking aid according to claim 1, wherein an upper border of a front and/or rear wall of the stacking aid (1) is designed such that the upper border of the front and/or rear wall can be adapted to the changing height of the stack of goods already stacked on the loading aid.

3. The stacking aid according to claim 2, wherein the front wall (10) comprises a plurality of elements which are interconnected in a push-in manner or by a hinge, or being a roller shutter or a sliding wall.

4. The stacking aid according to claim 2, wherein the rear wall (11) comprises a plurality of elements which are interconnected in a push-in manner or by a hinge, or being a roller shutter or a sliding wall.

5. The stacking aid according to claim 1 further comprising side walls (12) which can be fastened to the base (15).

6. The stacking aid according to claim 5, wherein the side walls (12) are able to be pushed into the base (15) or be connected to the base via a hinge.

7. The stacking aid according to claim 1 wherein the wall parts (10, 11, 12) include side walls (12), further comprising a front wall (10) that is connectable to the side walls (12).

8. The stacking aid according to claim 1, wherein the wall parts (10, 11, 12) include side walls (12) having vertical cutouts through which vertically movable pins (20) can reach under a loading aid (3) to lift or lower a pallet relative to the stacking aid (1).

9. The stacking aid according to claim 1 further comprising means for lifting the stacking aid (1) relative to the loading aid provided on at least one of the walls.

10. The stacking aid according to claim 9, wherein the means for lifting are cutouts in or projections on the wall which are connectable to an external device (21) for lifting the external device.

11. A method for stacking goods on a loading aid, comprising:
    providing a stacking aid that has wall parts and a base with an opening, wherein a height of at least one of the wall parts is alterable, and
    placing the loading aid on the stacking aid by inserting the loading aid through the opening, wherein the stacking aid is removable from the loading aid after the goods are stacked,
    loading the loading aid with the goods using the stacking aid, thereby altering the height of the at least one of the wall parts, and
    lifting the loading aid relative to the stacking aid, whereby the goods are lifted out of the stacking aid and at the same time continuously wrapped with a stabilizing means for stabilization.

12. The method according to claim 11, wherein the stabilizing means is a film.

13. The method according to claim 12, wherein the wrapping of the stack of goods by the film is effected by rotating a film supply roll about the stack of goods.

14. The method according to claim 13, wherein the film is wrapped under mechanical tension around the stack of goods.

15. The method according to claim 11, wherein the loading aid is lifted relative to the stacking aid by means of an external lifting device.

16. The method according to claim 11, wherein the stacking aid is lowered relative to the loading aid.

17. The method according to claim 11, wherein the height of at least one wall part of the stacking aid is increased with increasing height of the stack of goods.

18. The method according to claim 11, wherein the loading aid is a pallet.

19. A system for stacking goods on a loading aid using a device according to claim 1, the system comprising a device for lifting the loading aid relative to the stacking aid and a device for wrapping with film a portion of the stack of goods which has been exposed by the lifting.

* * * * *